United States Patent
Turner

(10) Patent No.: US 9,367,211 B1
(45) Date of Patent: Jun. 14, 2016

(54) INTERFACE TAB GENERATION

(71) Applicant: Amazon Technologies, Inc., Reno, NV (US)

(72) Inventor: Andrew Russell Turner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 13/672,597

(22) Filed: Nov. 8, 2012

(51) Int. Cl.
*G06F 3/0483* (2013.01)
*G06F 9/50* (2006.01)
*G06F 11/34* (2006.01)

(52) U.S. Cl.
CPC ............... *G06F 3/0483* (2013.01); *G06F 9/50* (2013.01); *G06F 11/3433* (2013.01)

(58) Field of Classification Search
None
See application file for complete search history.

(56) References Cited

U.S. PATENT DOCUMENTS

| | | | | |
|---|---|---|---|---|
| 6,232,972 | B1* | 5/2001 | Arcuri et al. | 715/815 |
| 6,396,509 | B1* | 5/2002 | Cheng | 715/706 |
| 6,934,735 | B1* | 8/2005 | Emens | H04L 67/325 709/203 |
| 7,665,090 | B1* | 2/2010 | Tormasov et al. | 718/104 |
| 8,341,519 | B1* | 12/2012 | Warr et al. | 715/243 |
| 2002/0002039 | A1* | 1/2002 | Qureshey | G06F 17/30749 455/344 |
| 2003/0052911 | A1* | 3/2003 | Cohen-solal | 345/738 |
| 2004/0100982 | A1* | 5/2004 | Balasubramanian | 370/429 |
| 2004/0201608 | A1* | 10/2004 | Ma et al. | 345/719 |
| 2006/0053077 | A1* | 3/2006 | Mourad | G06F 17/3089 705/51 |
| 2006/0075068 | A1* | 4/2006 | Kasriel et al. | 709/217 |
| 2006/0161865 | A1* | 7/2006 | Scott | G06F 3/0481 715/810 |
| 2006/0230356 | A1* | 10/2006 | Sauve et al. | 715/777 |
| 2007/0243925 | A1* | 10/2007 | LeMay et al. | 463/20 |
| 2008/0177994 | A1* | 7/2008 | Mayer | 713/2 |
| 2009/0183155 | A1* | 7/2009 | Praitis et al. | 718/100 |
| 2009/0249222 | A1* | 10/2009 | Schmidt | H04N 21/2368 715/751 |
| 2009/0287824 | A1* | 11/2009 | Fisher et al. | 709/226 |
| 2010/0023788 | A1* | 1/2010 | Scott | G06F 1/3209 713/320 |
| 2011/0016417 | A1* | 1/2011 | Shiplacoff | G06F 1/3228 715/768 |
| 2011/0022984 | A1* | 1/2011 | van der Meulen | G06F 9/44526 715/830 |
| 2011/0055395 | A1* | 3/2011 | Wang et al. | 709/226 |
| 2011/0231517 | A1* | 9/2011 | Srinivasan | G06F 17/30861 709/219 |

(Continued)

OTHER PUBLICATIONS

Iwaya, "Save and Send Tabs to a Different Computer in Chrome," Sep. 15, 2010, http://www.howtogeek.com/90113/save-and-send-tabs-to-a-different-computer-in-chrome/.*

(Continued)

*Primary Examiner* — Ryan Barrett
(74) *Attorney, Agent, or Firm* — Thorpe North & Western LLP

(57) ABSTRACT

Technology is described for generating an interface tab in an application. The method may include receiving an instruction to create an interface tab in the application. Another operation may be defining computing resources that are to be applied to loading of the interface tab and page content. The interface tab and the page content may be loaded using the computing resources defined.

32 Claims, 13 Drawing Sheets

(56) References Cited

U.S. PATENT DOCUMENTS

| | | | |
|---|---|---|---|
| 2012/0131321 A1* | 5/2012 | Jitkoff et al. ................... 713/2 |
| 2012/0192080 A1* | 7/2012 | Lloyd ............... G06F 17/30905 |
| | | | 715/744 |
| 2012/0331385 A1* | 12/2012 | Andreas ............... G11B 27/034 |
| | | | 715/716 |
| 2012/0331407 A1* | 12/2012 | Ainslie ............ G06F 17/30873 |
| | | | 715/760 |
| 2013/0014047 A1* | 1/2013 | Joo et al. ....................... 715/777 |
| 2013/0031490 A1* | 1/2013 | Joo et al. ....................... 715/760 |
| 2013/0061234 A1* | 3/2013 | Piira et al. ..................... 718/103 |
| 2013/0067186 A1* | 3/2013 | Pronovost ............... G06F 12/02 |
| | | | 711/170 |
| 2013/0152010 A1* | 6/2013 | Weber et al. .................. 715/783 |
| 2013/0187933 A1* | 7/2013 | Qin et al. ....................... 345/501 |
| 2014/0007126 A1* | 1/2014 | Liu et al. ....................... 718/104 |
| 2014/0047360 A1* | 2/2014 | Kay et al. ...................... 715/760 |
| 2014/0068436 A1* | 3/2014 | Steiner .......................... 715/719 |
| 2014/0089914 A1* | 3/2014 | Kay et al. ...................... 717/176 |
| 2014/0094163 A1* | 4/2014 | Widdowson ........ H04L 67/2847 |
| | | | 455/422.1 |
| 2014/0333633 A1* | 11/2014 | Zhang ....................... G06T 1/20 |
| | | | 345/503 |
| 2014/0365794 A1* | 12/2014 | Decker ................. G06F 1/3246 |
| | | | 713/320 |
| 2015/0193394 A1* | 7/2015 | Peters ............... G06F 17/30902 |
| | | | 715/234 |
| 2015/0205462 A1* | 7/2015 | Jitkoff ............... G06F 17/30876 |
| | | | 715/777 |
| 2015/0205761 A1* | 7/2015 | Shah ................. G06F 17/30899 |
| | | | 715/234 |

OTHER PUBLICATIONS

Dachis, "SendTab Easily Moves Your Browser Tabs to Nearly Any Device," Oct. 3, 2011, http://lifehacker.com/5846106/sendtab-easily-moves-your-browser-tabs-to-nearly-any-device.* philiKON, "BarTab 2.0," Sep. 20, 2011, https://web.archive.org/web/20110920001710/https://addons.mozilla.org/en-US/firefox/addon/bartab/.*

W3C, "HTML5: Edition for Web Authors," Jul. 7, 2011, http://www.w3.org/TR/2011/WD-html5-author-20110809/spec.html.*

Basu, "8 Cool Tips & Tricks to Make Most of Google Chrome," May 14, 2009, http://www.makeuseof.com/tag/8-cool-tricks-to-put-some-more-sheen-on-google-chrome/.*

Visibo, "TooManyTabs—Saves Your Memory 1.3.3," Apr. 30, 2011, https://web.archive.org/web/20110430053708/https://addons.mozilla.org/en-US/firefox/addon/toomanytabs-saves-your-memory/.*

Timme, "How to Limit CPU Usage of a Process with cpulimit (Debian/Ubuntu)," Aug. 28, 2009, https://web.archive.org/web/20090914040437/http://www.howtoforge.com/how-to-limit-cpu-usage-of-a-process-with-cpulimit-debian-ubuntu.*

* cited by examiner

INTERFACE TAB GENERATION

BACKGROUND

When accessing information through a computer application, users may like to have quick access to as much information as possible from various data sources. These data sources may be located on a local computing device where the application is executing or the data sources may be located on a computing device that is accessible through a computer network.

In the area of graphical user interfaces (GUIs), when users have access to information from multiple data sources in an application, the users may want to switch back and forth between the information being displayed from multiple data sources. In order to quickly access or switch between the viewing of information from multiple data sources, multiple document interfaces (MDIs) have been developed that provide fast access to information from the multiple data sources. One type of multiple document interface is a tabbed interface in which each document, sheet, database, spreadsheet, page or data source has at least one corresponding interface tab and possibly child windows that may be accessed by the user. An interface tab may be selected by the user to view the page content associated with the interface tab while child windows for the other interface tabs may remain hidden until those interface tabs are later selected.

An example of a tabbed interface may be a browser that may be used to view documents accessed from the Internet, a wide area network, a local network or a local device. Many browsers allow users to access multiple data sources at a time. These data sources may be displayed in a separate interface tab and the user may select the interface tab in order to view the interface tab. Each interface tab opened by a multiple document interface application (e.g., web browser) consumes memory and processing resources on the computing device being used. In addition, when the page content associated with the interface tab begins to load, network bandwidth may also be consumed.

DETAILED DESCRIPTION

Figure 1:
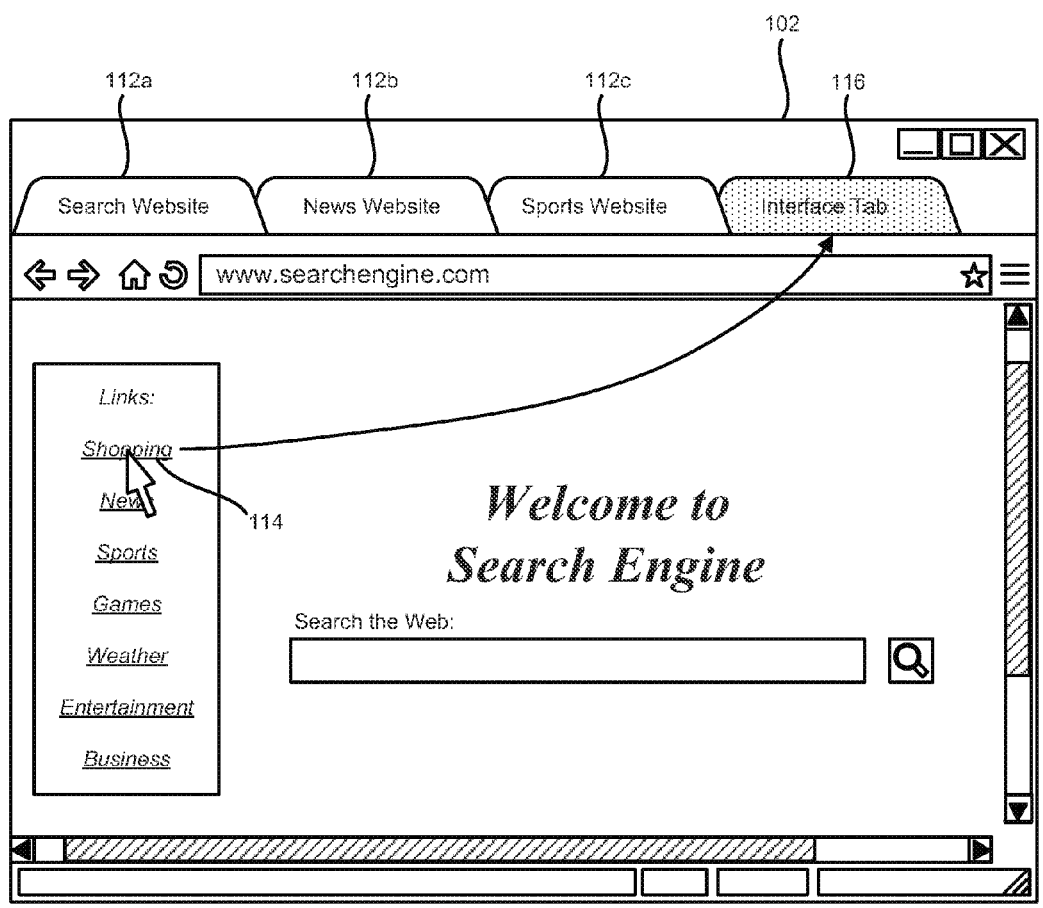
FIG. 1 is a diagram illustrating an example of interface tab generation in an application.

A technology is provided for generating an interface tab in an application. The technology may include receiving an instruction to create an interface tab for at least one data source accessible through the application. Computing resources may be defined to be applied to the loading of the interface tab and associated page content. The computing resources applied to the loading of the interface tab and page content may be limited until a user selects the interface tab for viewing. The limited computing resources may be used by applying a portion of the computing resources to loading an interface tab or by applying no resources to loading an interface tab before the interface tab is selected.

For example, a web browser may be configured to receive an interface tab creation action initiated by a user interaction with a computer. The web browser may receive a command from a user via a user interface. For example, a function keyboard key may be pressed while a link is selected using a pointing device associated with a computer in order to initiate interface tab creation. Examples of function keys may be a "command" key or a "control" key that is pushed on a keyboard while a link is selected with the pointer device (e.g., mouse). This link selection may create a new interface tab in the web browser. In another example, the interface tab creation action may be initiated by a touch based user interface or a video based input. Furthermore, a multi-finger action may be received via a touch screen or a gesture action may be received via a video input to initiate the creation of the interface tab.

When the web browser generates a new interface tab, a universal resource locator (URL) may be tied to that interface tab. In this technology, the interface tab may wait to load page content associated with the URL until the interface tab is selected by a user (e.g., clicked on). In other words, page content (e.g., web page content) may not actually load into the interface tab or page content may load at a reduced rate until the interface tab is selected by the user in order to view the interface tab. In one example, the interface tab may be assigned limited network bandwidth, processor resources and/or memory resources for loading page content for the interface tab. In another example, the interface tab and associated page content may be downloaded at a defined rate. Defining the network bandwidth resources to be used by the interface tab to load page content may avoid slowing down a computing system. The term "page content" may refer to content loaded from a data source into the interface tab and the page content may include HTML (HyperText Markup Language) content, scripted content, programmed content (e.g., Java based), web application content, video content, audio content, text content, image content, database content and any other content loadable from a data source. The page content may be loaded from locally stored data sources or from network accessible data sources Computing resources may be defined to be applied to the loading of the interface tab and page content. The computing resources may then be applied to load the interface tab at the defined rate. For instance, processor resources, memory resources and network bandwidth resources may be checked to determine what resources are available. Processor resources may include CPU processing availability, graphics card processing, local bus processing and similar processing resources. Memory resources may include various forms of RAM (random access memory), ROM (read only memory), hard drives, optical storage and other memory devices. Network resources may include data bandwidth available for uploading and/or downloading over an internet connection, a local area network connection, a wide area network connection, a wireless connection or another networking connection.

FIG. 1 illustrates an example of an application 102 with multiple interface tabs 112a-c that may have already been opened and loaded with page content. For example, the application 102 may be a web browser or another application that may display multiple pages with information from data sources using multiple interface tabs 112a-c. The illustrated interface tabs 112a-c in FIG. 1 may have already been viewed by the user, or the interface tabs 112a-c may have been loaded in the background using available computing resources.

A user may select a link 114 (i.e., a link containing a URL) using an interface tab creation command. This interface tab creation command may use a keyboard function modification key, a pop-up menu, user interface object or another user interface command associated with the creating a new interface tab 116 for the link selection. In addition, the interface tab creation command may be initiated by a touch based user interface, a motion based input, a multi-finger touch action on a touch screen, a gesture on a touch screen, a gesture action in front of a camera, or a voice command may be received to initiate the creation of the interface tab. In response to the interface tab creation command, operation or message, the new interface tab 116 may be created.

This new interface tab 116 may be configured to load page content in one or more ways. In one configuration, the interface tab 116 may have an associated URL, address or data reference for which related page content may not load until the user selects the interface tab 116. The selection of the interface tab 116 may make the interface tab 116 available for viewing (e.g., brings the interface tab to the top, displays a pane for the interface tab, or otherwise allows the user to view the interface tab). In other words, the interface tabs 112a-c may not load in the background as in existing web browsers, but instead the new interface tab(s) 116 may be created and may be ready to start loading page content as soon as the interface tab 116 is selected in the graphical user interface.

In another configuration, the interface tab 116 may load using a limited amount of computing resources. The limited computing resources may be defined to be used at various rates for individual computing resources or the same rate for a group of computing resources. For example, a processor resource may be set to use 10% of overall processing resources, a network bandwidth rate may use 25% of network resources and a memory resource may use 3% of the memory resource for loading page content. In another example, the computing resources may be defined to consume the same percentage for one group of resources. For example, the computing resource usage may be set at 5% consumption of the overall computing resources available in each computing resource category. Alternatively, the use of the computing resources may be set to use 0% of the computing resources in the group until the interface is selected.

In one configuration, the system may detect available network bandwidth, processor resources and/or memory resources and make a determination about whether to start loading the interface tab 116 in the background by checking predefined computing resource thresholds. If predefined computing resource thresholds are met, then the interface tab 116 may start loading. For example, if 50% or more of a computing resource is idle, then the computing resource may be applied to loading of the interface tab 116. Where the thresholds for consuming computing resources are not met, then an interface tab 116 may not load page content until the user selects the new interface tab 116.

Figure 2:
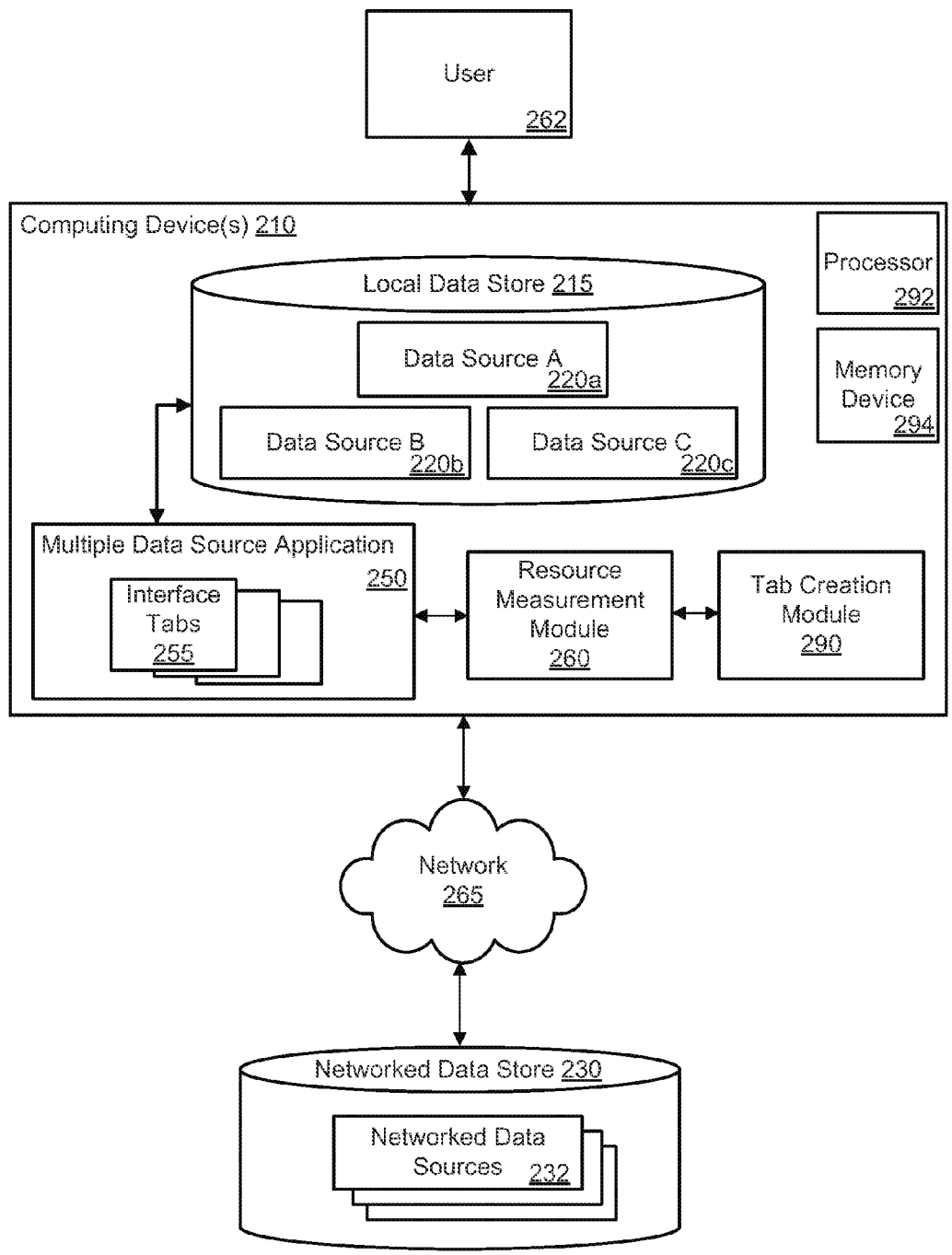
FIG. 2 is a block diagram illustrating an example of a system for generating a user interface on a computing device.

FIG. 2 illustrates an example system for creating a plurality of interface tabs 255 for a multiple data source application 250. The multiple data source application 250 may be executed using a processor 292 and memory device 294 on one or more computing device(s) 210. An example of a multiple data source application 250 may be an application with a multiple document interface (MDI) that enables switching between multiple pages or documents within the application 250. Pages or documents may be contained in multiple child windows that may be associated with a parent window, and the child windows may contain documents or information from various data sources 220a-c. A tabbed interface may be used to switch between multiple documents, pages or child windows in the applications with the multiple document interface.

Data sources 220a-c may be locally connected to the multiple data source application 250 via a local data network connection (e.g., Fibre Channel or local network connection). Interface tabs 255 may be associated with the data sources 220a-c and data from the data sources 220a-c may be displayed in interface tabs 255. For example, Data Source A 220a may be connected to the first interface tab, Data Source B 220b may be connected to a second interface tab and so forth. In addition, an interface tab 255 may obtain data from multiple data sources 220a-c or multiple interface tabs 255 may receive data from a single source 220a. For example, portions of page content data may be obtained from multiple data sources. Further, multiple tabs may have duplicate data from one data source and various data from other data sources. For example, the interface tab 255 may display a hyper-text markup language (HTML) document, a word processing document, a spreadsheet, an entity-relation (ER) diagram illustrating a database layout, a data table, images, other types of documents, pages, files or other data.

The data sources 220a-c may be stored in a local data store 215. The data store 215 may store data sources 220a-with page content that may be accessible to the multiple data source application 250. The term "data store" may refer to any device or combination of devices capable of storing, accessing organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store 215 may include storage systems such as a SAN (Storage Area Network), cloud storage network, volatile or non-volatile RAM, optical media or hard-drive type media. The page content stored by the data sources 220a-c may include video content, audio content, text content, graphical content or any other type of content. Some specific examples of page content may include web applications, full-length movies, video clips, video trailers, television programs, animated programs, audio books, pod casts, radio programs, books, magazines, articles, RSS (Really Simple Syndication) feeds, live video events, still image slide shows and other types of content.

Page content for the interface tabs 255 may also be accessed from a networked data store 230 and networked data sources 232. The network 265 may be the internet, a wide area network (WAN), a local area network (LAN) or another computing network. Thus, page content may be loaded from the internet or another network when an interface tab 255 in an application (e.g., a web browser) is selected.

A resource measurement module 260 may measure computing resources available for interface tab creation. The resource measurement module 260 may measure certain computing resources. Examples of computing resources may include memory device resources, processing resources, display screen resources, network bandwidth resources and so forth. The resource measurement module 260 or another component of the system may detect an availability level of computing resources that may be used to load an interface tab and page content. For example, the resource measurement module 260 may detect resource availability, such as how much memory is remaining, how much bandwidth is available, what the CPU load is, etc. The resource measurement module 260 may set a predetermined amount of computing resources to be used based on the availability level of the computing resources.

A tab creation module 290 associated with the multiple data source application 250 may create an interface tab and load page content from one or more of the plurality of data sources into the interface tab. The interface tab may be created in response to input 262 from a user. The input from the user 262 may be the selection of a link in a web browser, accessing a pop-up menu, selecting a document from a menu, opening a document, opening a spreadsheet, accessing another data source available to the application 250 which starts the process of interface tab creation or any of a myriad of other operations performed by the user 262 which result in creation of the interface tab. The interface tab 255 may be loaded using a predefined amount of computing resources as identified by the resource measurement module 260.

In one configuration, no computing resources may be applied to loading page content until the interface tab 255 is selected. The application of no computing resources to load the page content may be a default setting and the page content may wait to load until the interface tab is selected. The interface tab may be created using a limited amount of computing resources even though no resources may be applied to loading the page content into the interface tab. Thus, an unfilled interface tab may be created and displayed without loading page content until the interface tab is selected and displayed to the user 262. For example, a user 262 may use a web browser application and may access a document (i.e., page content) with a number of links to other page content or documents. The user 262 may click on links that the user 262 desires to view and open multiple interface tabs to be read after the currently viewed document has been read in the current interface tab. An interest in numerous news articles, for example, may result in many interface tabs 255 being opened (e.g., tens or dozens of interface tabs may be opened). In existing web browsers, a large number of new interface tabs may individually request as many computing resources as possible from the computing device 210 in order to open quickly. When computing resources, such as processing resources, network bandwidth resources and memory resources are requested by a large number of interface tabs within a short period of time, the computing device 210 may become unresponsive, sluggish or even crash. In order to avoid consuming a proportion of the computing resources that may cause the computing device 210 to be unresponsive, the presently described technology may open the interface tabs 255 but not load any of the page content (e.g., web pages) into the browser from a network data store or local data store. As a result, the computing device's 210 response time may remain faster and the operating system on the computing device 210 is likely to be more stable using the present technology than with existing technologies.

The effects of a large number of interface tabs 255 opening using existing technologies may be even more severe in mobile devices where the computing resources may be limited to maintain the portability of the device. Limiting the computing resources used by interface tabs 255 may be useful in the case of mobile devices. Mobile devices sometimes have a more limited processing capacity, memory device capacity and network bandwidth availability when compared to non-mobile computing devices. Being able to conserve processing bandwidth, memory and/or network bandwidth until the interface tab is selected or requested for viewing by a user 262 may free up system computing resources in the mobile device. In addition, the interface tabs 255 that are not loaded may provide a placeholder for the user 262 to view desired pages or information in the future.

In an example configuration, a predefined amount or rate for computing resources may be applied to loading page content into background interface tabs 255, such as by applying limited network bandwidth and processor power to loading the page content into the interface tabs. The amount of computing resources applied to an interface tab may be a predefined proportion, a set amount or a set percentage of specific computing resources being allocated. For example, an analysis of the computing resources may have identified that 2% of the processor power and 2% of the network bandwidth are desirable amounts of computing resources to apply to interface tabs, particularly where the interface tabs may not be used immediately. When the computing resources have been allocated, then the interface tab may load using the computing resources at the 2% rate. This fixed allocation approach may be helpful where, for example, 12 interface tabs have been opened such that 2% of the computing resources may be applied to each interface tab and this allocation among the 12 interface tabs 255 may consume 24% of the computing resources. A predefined proportion of computing resources may be applied to loading page content based on the percentage of a computing resource that is available. For example, if 50% of the CPU load is available, then 4% of the CPU load may be applied to loading the page content. If 25% of the CPU load is available, then 2% of the CPU load may be applied to loading the page content and so forth. In another example, a set amount of 2 megabytes (MB) of RAM, and 0.5 megabits (Mb) of network bandwidth may be allocated for loading page content into an interface tab.

This limited or restricted resource allocation is in contrast to existing tab interface allocation situations where the interface tabs may otherwise make a request to consume the remaining computing resources on the computing device 210. In another example, no computing resources may be applied to the loading of page content because very little or no computing resources are actually available or because the user 262 otherwise desires to not devote resources to the loading of the page content.

The resource measurement module 260 may check to determine whether a threshold amount of processing resources are available for loading the page content into the interface tab before loading of page content begins. For example, the threshold amount of processing resources may be set to check whether at least 20% of the processing resources are available before an interface tab may load. Then the resource measurement module 260 may periodically or repeatedly check the system until this threshold is reached. When the threshold amount of processing resources become available (e.g., more than 20% free), then page content in an interface tab may be allowed to begin to load even if the interface tab has not been selected by a user. This threshold checking may allow a certain amount of processing resources (e.g., processing time slices or network bandwidth) to be left available for certain desirable operations such as processing of the user interface, processing hardware interrupts, loading of content being currently viewed or other desirable processing in order to maintain a reasonable user interface response time.

In another example, the resource measurement module 260 may check whether a threshold amount of network bandwidth is available for downloading of the page content into the interface tab. This checking of the threshold amount means that while a defined portion of the network bandwidth greater than the threshold amount is being consumed by certain page content (e.g., a web page being viewed) or other networking processes, then other interface tabs 255 that have not been selected by the user 262 may not be loaded. For example, if 84% of the network bandwidth is being consumed by objects on an open interface tab that is being viewed by a user 262, then other interface tabs 255 may not be allowed to load. However, when the network bandwidth falls below an example threshold of 80%, then the unselected interface tabs 255 may be allowed to consume a defined or requested amount of network bandwidth. The network bandwidth consumed by interface tabs 255 may be set at a limited amount of bandwidth, such as 5%-10% of the total available bandwidth or the interface tabs 255 may be allowed to consume 0% of bandwidth requested by the interface tabs 255.

The resource measurement module 260 may also divide content objects in page content into multiple object types. An example of object types may be size categories, video objects, text objects, audio objects, graphic object, etc. The resource measurement module 260 may select certain types of object types to load at certain rates or to not load until the interface tab is selected. For example, the object categories may be a small content objects that use reduced bandwidth to load, medium content objects, a large content objects that use increased network bandwidth. Examples of small content objects that use reduced bandwidth may be text on page content or image with a file size smaller than a predefined size. Examples of large object sizes are content objects that consume an increased bandwidth amount such as: user interface controls that download a significant amount of information, animations, a video player, an audio player, or similar objects that use increased bandwidth. When the content objects have been categorized, then a lower amount of bandwidth may be used to load small objects from the small object category into an interface tab. Further, no bandwidth may be applied to medium content objects or large content objects (i.e., larger content objects) that use an increased amount of network bandwidth until the interface tab has been selected. In another example, if a limited percentage of computing resources are available for loading the page content into the interface tab, then the small content objects may load first followed by larger content objects.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 3:
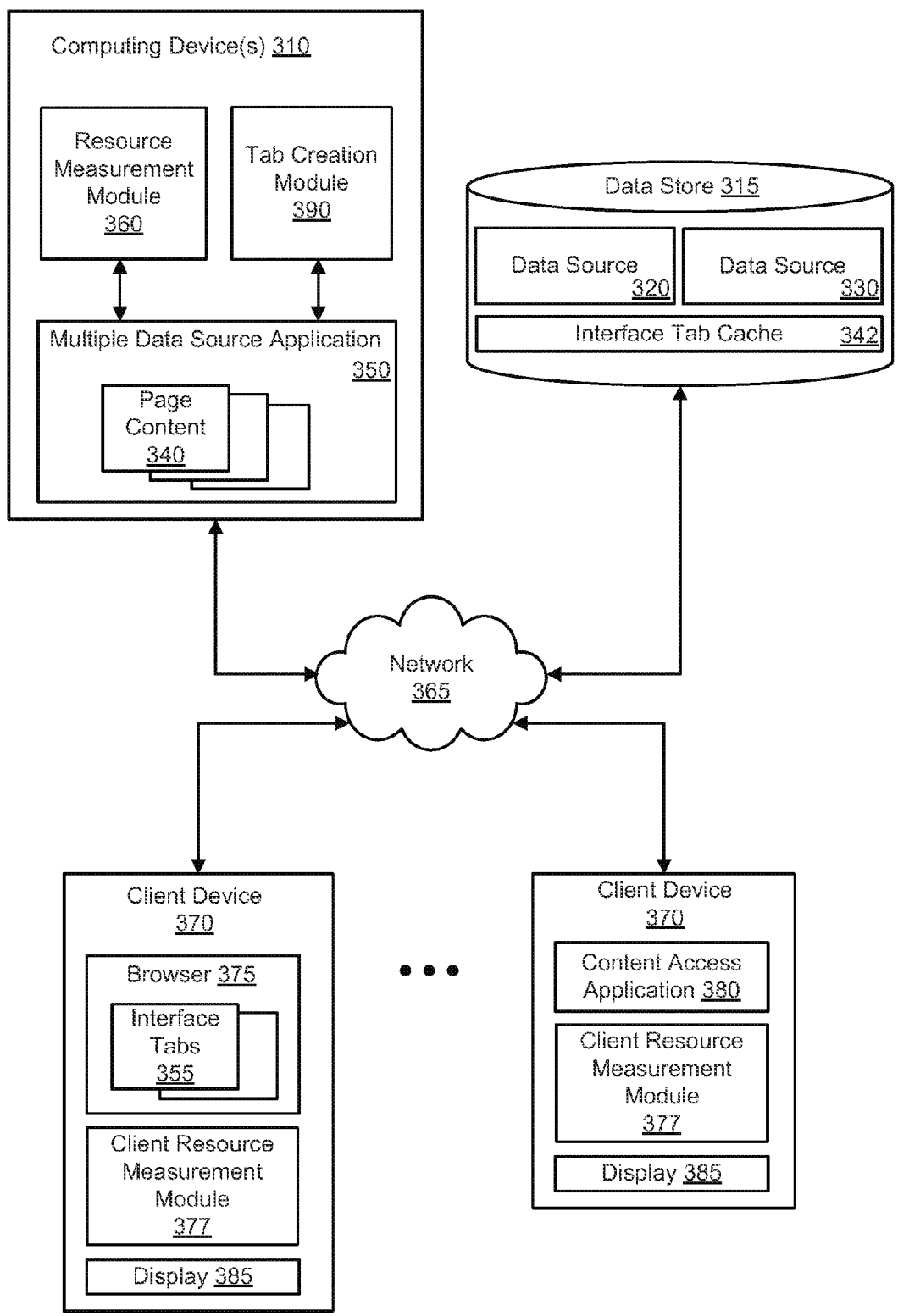
FIG. 3 is a block diagram illustrating an example of a system for creating multiple interface tabs in an application.

FIG. 3 is a block diagram of a system for creating interface tabs 355 in an application. In this configuration, a portion of a multiple data source application 350 may be located on a computing device 310. The multiple source data application 350 may be able to access a data store 315 that contains multiple data sources 320 and 330. One portion of a multiple data source application 350 may be hosted on a computing device 310 that is a server and the other portion of the application may be hosted on the client device 370 as a browser 375 (e.g., web browser) or content access application 380. For example, the multiple data source application 350 may be a server hosted portion of the browser 375 that assembles an entire web page or a portion of a web page which may be transmitted across a network 365 for viewing in a second portion of the application in a browser 375 on a client device 370. The computing device 310 may provide a split architecture where some of the browser's 375 processing may be performed on the server. More specifically, the computing device 310 (e.g., server) may determine which sub-systems (e.g., networking, HTML, page rendering) to execute on the client device 370 and which sub-systems to execute on the computing device 310. Partially or completely assembled web pages may then be sent from the client device 310 on to the browser 375 or content access application 380 on a client device 370 via the network 365 for viewing.

The computing resources may be restricted from loading page content for an interface tab onto the computing device 310 (e.g., the server) until the user selects an interface tab on the client device 370. A client resource measurement module 377 may be used to measure the available computing resources on the client device 370. The amount of resources identified as being available to load an interface tab may be: no resources, a fractional amount of resources, or a majority of the device resources based on the measured available resources. In one example, the client resource measurement module 377 may also be able to detect changes in resources on a client device 370. If the network connection changes from a cellular connection to a Wi-Fi connection, then the loading of page content may be increased or modified by the client device 370.

The client resource measurement module 377 may also divide content objects in page content into multiple object types, as discussed earlier. An example of object types may be size categories, video objects, text objects, audio objects, graphic objects, etc. The client resource measurement module 377 may select certain types of object types to load at certain rates or not to load until the interface tab is selected on the client device 370. A client device 370 may be a device such as, but not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system or any device with a display 385 that may receive and present the interface tabs 355.

In one client device configuration, the client device 370 may have a content access application 380 that receives page content 340, web pages or web application information from the multiple data source application 350. Any information or page content 340 assembled on the server side may be sent to the client device 370 for consumption by the browser 375 or the content access application 380. The page content 340 may be viewed by users using the display 385 on the client device 370.

As mentioned earlier, in order to preserve resources on the computing device 310 or server, if a user initiates new interface tabs 355, the loading of page content 340 from a network on the server based side of the browser 375 may be delayed until the user selects an interface tab 355 on the client device 370 for viewing. Waiting until an interface tab is selected may conserve processing resources, memory resources, network bandwidth resources and other computing device 310 resources.

In one example, the resource measurement module 360 may assess the resources on the computing device 310 that may be available for loading interface tabs 355. The tab creation module 390 may receive instructions to create a new interface tab 355 in the multiple data source application 350. At this point, the tab creation module 390 may identify a reference to page content 340 for an interface tab 355 and associate the page content 340 (e.g., using a link) together with the new interface tab 355. When the computing resources are available, then the interface tab 355 may be loaded in the background at a throttled or limited rate on the computing device 310 as defined by the tab creation module 390.

The resource measurement module 360 may also divide content objects within page content into multiple object types, as discussed earlier. The resource measurement module 360 may select certain types of object types to load at certain rates on the computing device 310 or not to load until the interface tab is selected.

In another example, one interface tab at a time may be open on the client device 370 and the multiple data source application 350 on the computing device 310 may track new interface tabs (e.g., on a server). When the interface tab currently being viewed on the client device 370 is closed, the multiple data source application 350 may send the page content 340 and an associated interface tab from a list of queued up interface tabs to the client device 370 for display.

The computing device 310 may also cache the page content 340 of interface tabs 355 that are being loaded by the multiple data source application 350 for use by multiple browsers 375 and content access applications 380. The page content 340 of the interface tab 355 may be stored in an interface tab cache 342. This allows a multiple data source application 350 (such as a split browser) on a computing device 310 to cache portions of page content 340 or entire pages that may then be sent to client devices 370 immediately upon an interface tab 355 being selected. This caching may increase the speed at which the client device 370 receives the interface tab 355 and decrease the overall network bandwidth consumed by the computing device 310. For interface tabs 355 that are being frequently loaded by a large number of users, even if the multiple data source application 350 does not load the interface tab 355 until the interface tab is selected, the interface tab may sometimes already be cached in an interface tab cache 342 and may be obtained by the multiple data source application 350 without retrieving information via the network 365.

Figure 4A:
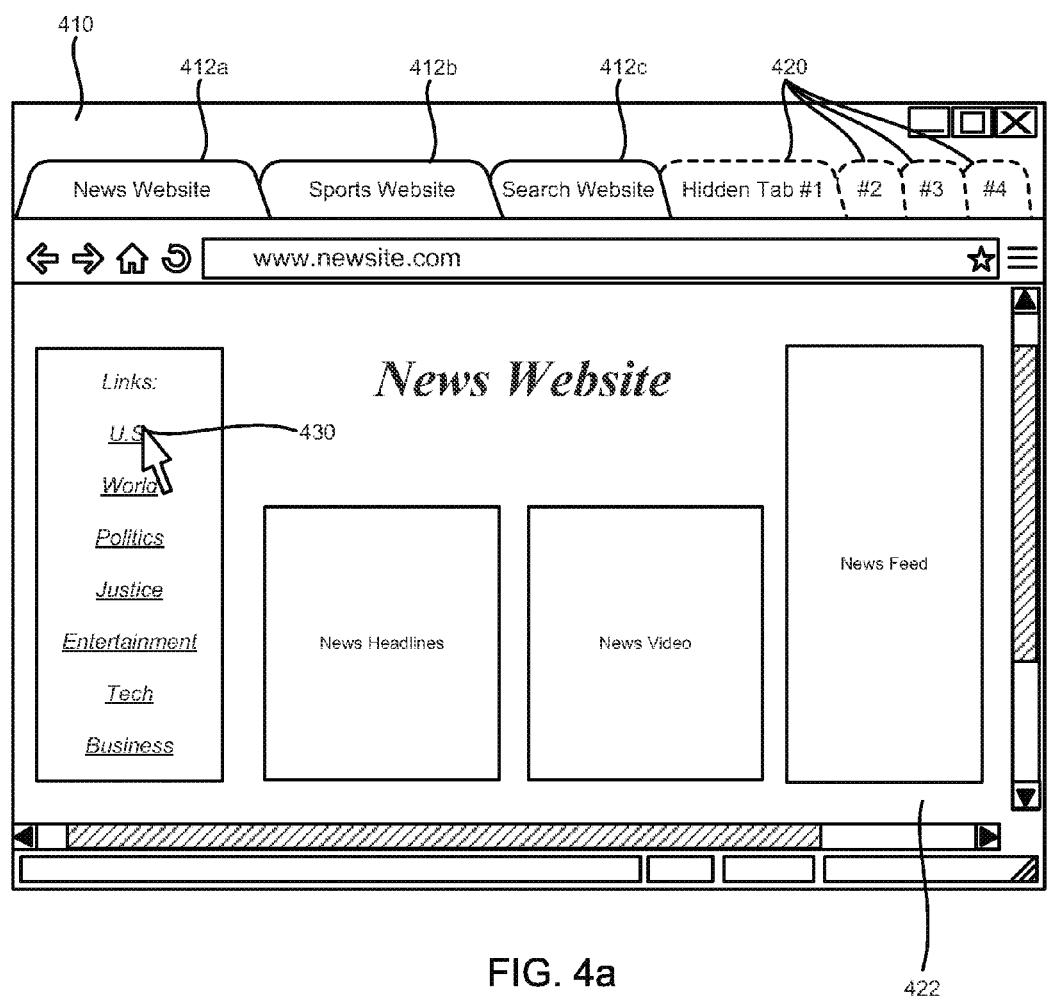
FIG. 4a is a diagram illustrating an example of a web browser with multiple interface tabs and additional hidden interface tabs.

FIG. 4a illustrates an example of a web browser 410 with multiple web pages 412a-c which may have been loaded into the web browser 410. Hidden interface tabs 420 may be created, for example, when a user selects or clicks on a link 430 in the web page 422. These interface tabs may be hidden because there is not enough screen space to load the interface tabs or because the interface tabs are blocked from loading until other interface tabs are closed. In one example, hidden interface tabs 420 may be used when the web browser 410 does not support display of more than one interface tab or display of page content from more than one address at a time. In another example, the interface tabs may be hidden in some configurations when there are not enough computing resources to load the interface tabs. When a displayed interface tab 412a is closed, then a previously hidden tab 420 may be displayed to a user. When the hidden interface tab is displayed, then the loading may begin for the page content associated with the hidden interface tab.

Figure 4B:
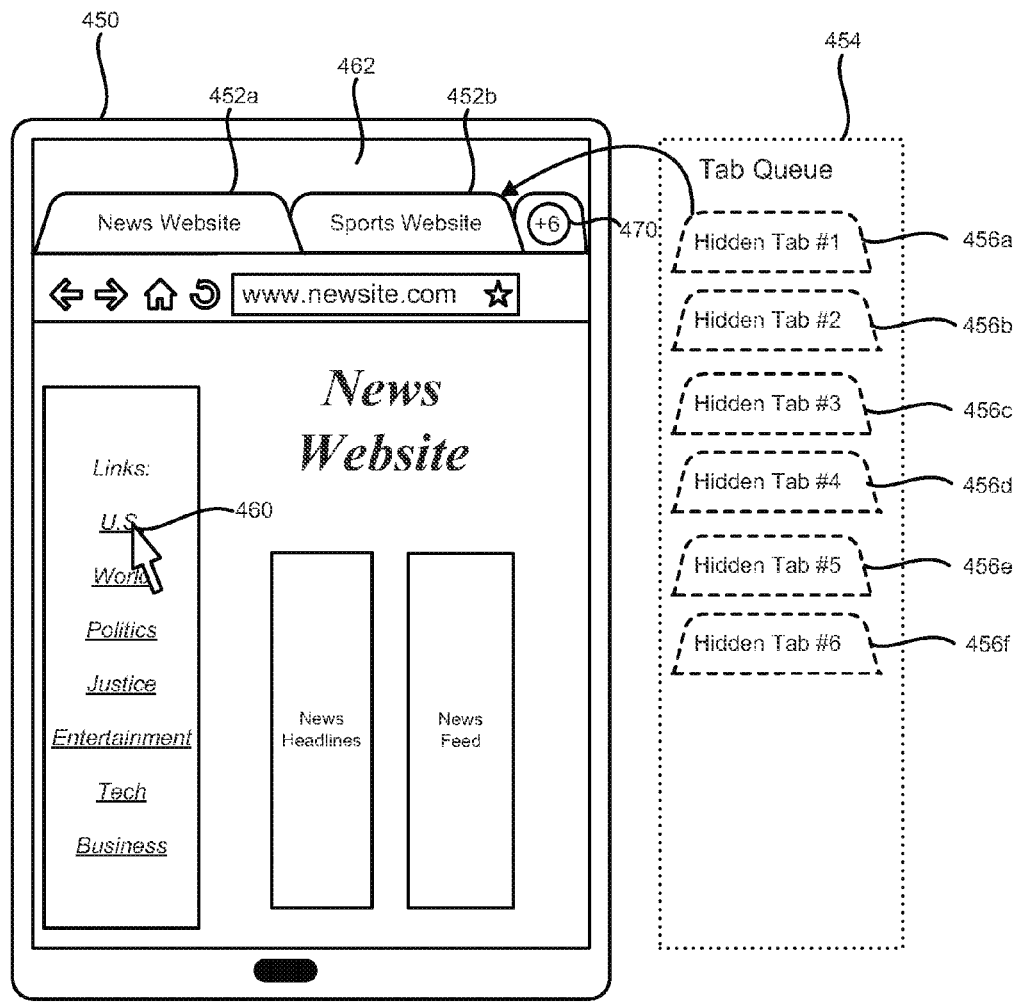
FIG. 4b is a diagram illustrating a web browser for a mobile device.

FIG. 4b illustrates an example web browser 462 for a mobile device 450 where screen space may be at a premium. Examples of such mobile devices 450 with limited screen space may be a cellular telephone, a tablet, an e-reader, a camera, a personal digital assistant or another device. In the illustrated example, screen space may be limited to displaying one or two interface tabs. To allow more than one or two interface tabs to be created and later loaded, a tab queue 454 may store a list of hidden interface tabs 456a-f. When a user selects a link 460 in the web browser 462 and uses the new interface tab command, then the web browser 462 may see if any more interface tabs may be opened in the display area of the web browser 462. More specifically, the web browser 462 may determine if there is enough screen space to display any more interface tabs across a physical screen area. If no additional room is available, then the interface tab 456a may be added to the tab queue 454. Later, when a user closes an interface tab 452b (or 452a), then a hidden interface tab 456a at the top of queue may be displayed and the hidden interface tab may be removed from the tab queue 454. For example, a user may have previously sent a number of hidden interface tabs 456a-f to the tab queue 454 and these hidden interface tabs 456a-f may be hidden in the tab queue 454. Then when the user closes the "sports website" interface tab 452b the "Hidden Tab #1" 456a may be removed from the top of the tab queue 454 and displayed in the mobile device's 450 web browser 462. The tab queue 454 may be organized in a first in last out (FILO) queue, a first in first out (FIFO) queue organization or another suitable queue organization.

The mobile device 450 user interface may also provide a user interface command or graphical interface control to display the tab queue 454 to the end user. In one example, the user may select (e.g., click or touch) a control such as the plus sign 470 with a numerical indicator on an interface tab to start a user interface to view the hidden interface tabs 456a-f. The numerical indicator may represent how many hidden interface tabs 456a-f are in the tab queue 454 The user interface initiated by the plus sign on the interface tab may display the tab queue 454 as a list in an overlay control, a new child window or a new parent window. Alternatively, the user may select a specific key combination to display the tab queue 454. When the user's command is received, the tab queue 454 may be displayed in a popup window or another user interface control that is temporarily displayed to allow the user to navigate through the list of hidden interface tabs 456a-f and select one of the hidden interface tabs 456a-f. In addition, the user may be allowed to edit, remove, or reorder hidden interface tab entries 456a-f in the tab queue 454. The user may scroll through the list of hidden interface tabs 456a-f and pick a hidden interface tab 456a-f to display in the web browser 462. If a touch screen interface is available, then the user may touch the screen at the icon of a desired hidden interface tab 456a-f to select a specific hidden interface tab 456a-f. Once the interface tab has been selected from the tab queue 454, the page content of the interface tab may begin to load.

Figure 5:
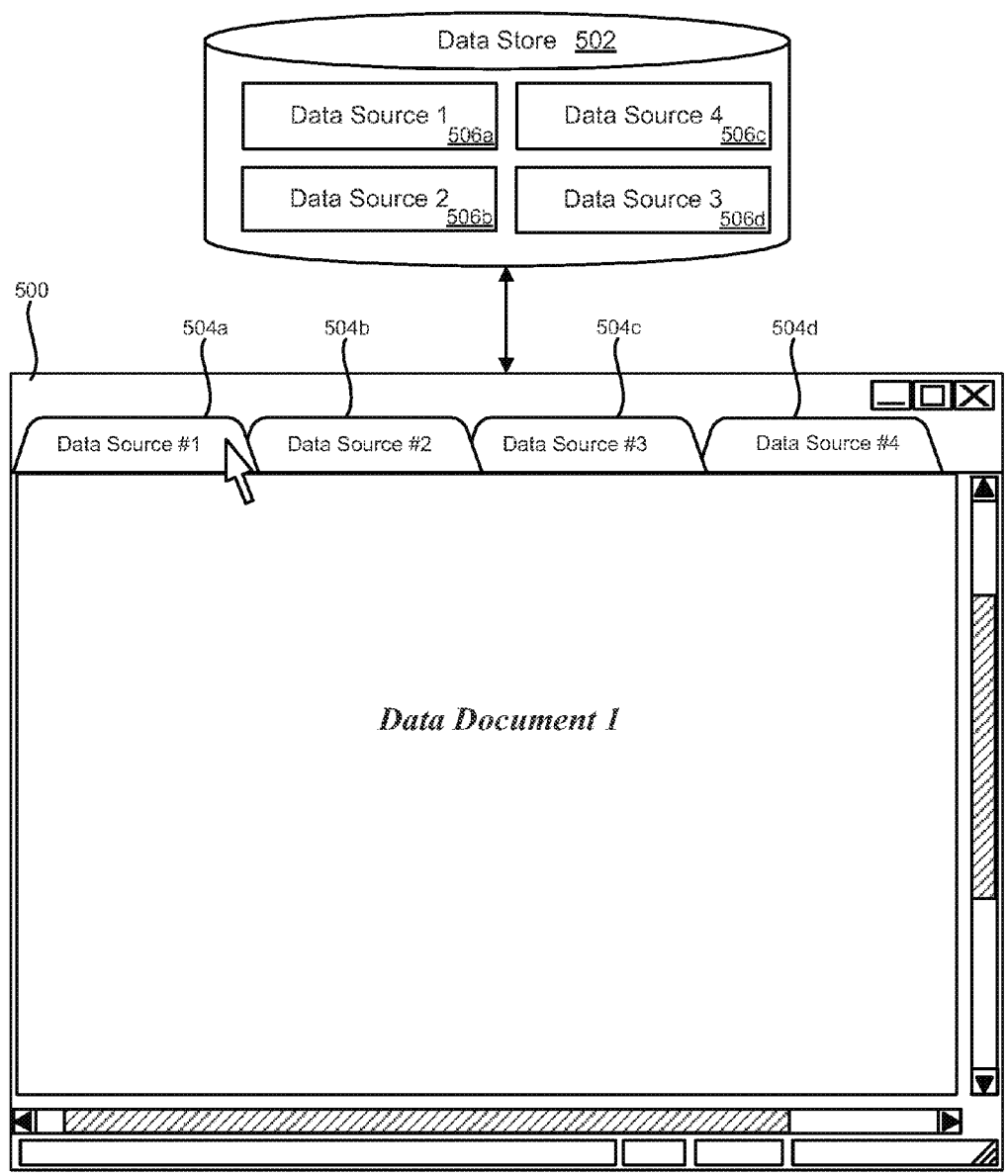
FIG. 5 is diagram illustrating an example of a multiple document interface (MDI) where each interface tab may be associated with a data source.

FIG. 5 illustrates a more generic example multiple document interface (MDI) 500 that may be used with the technology described here, where an interface tab 504a-d may be associated with at least one data source 506a-d. The data sources 506a-d may be stored in a data store 502 that is locally accessible to a computing device or the data store 502 may be accessible over a network. The multiple document interface (MDI) application 500 may be any application where a document or data source 506a-d is associated with an individual user interface control. When that user interface control is selected, the document or information from the data source 506a-d may be viewed in a child window within the multiple document interface 500 or parent window. While this technology has been explained as being primarily associated with interface tabs 504a-d, the data sources 506a-d may be associated with other user interface control types that may be used for switching between child windows in parent window. For example, a graphical button, drop down list, a toolbar with buttons, a ribbon with selectable text or other interfaces may be used as long as the graphical user interface controls enable a user to switch between viewing of child windows associated with the data sources 506a-d. In addition, the technology described in this disclosure may apply to any type of multiple document application including word processors, spreadsheets, presentation applications, drawing applications, network browsing applications, software development tools, data analysis tools or any other tool where a data source 506a-d is tied to a movable and/or hidable child window for viewing.

Figure 6A:
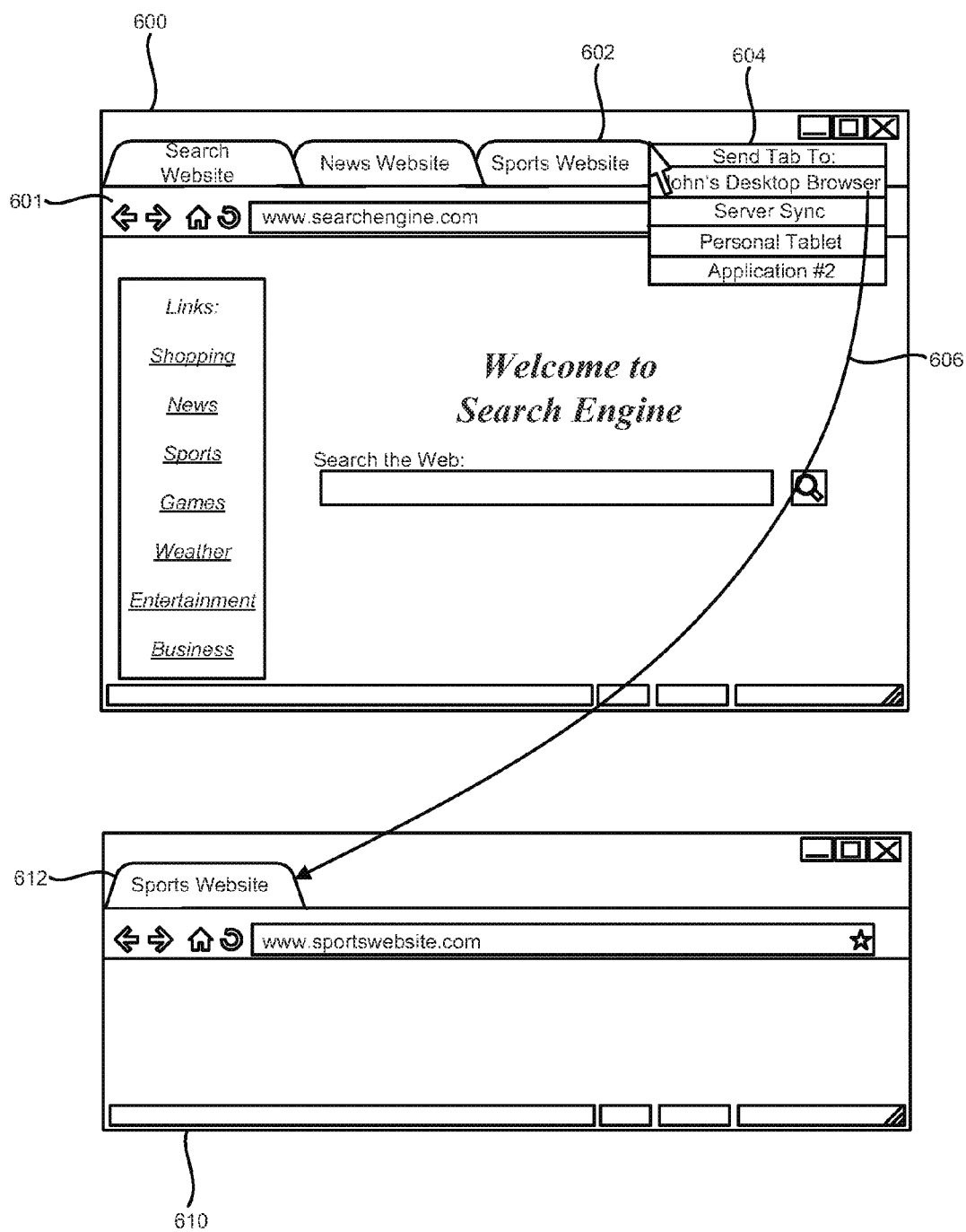
FIG. 6a is a diagram illustrating an example of interface tabs where an existing interface tab may be sent to a second application.

FIG. 6a illustrates a tabbed interface 600 where an already existing interface tab 602 may be sent to a second application 610. The second application 610 may be located on a separate computing device that may be accessible over a network. Alternatively, the second application 610 may be located with the first application 601 on one computing device. The interface tab 602 and associated page content link may be sent 606 to the second application 610 to be loaded after the newly created interface tab 612 is selected by a user in the second application 610. In one case, the interface tab 612 may begin loading if computing resources are immediately available or when there is one interface tab to be loaded.

The instructions sent to a computing device for sending the interface tab 602 to the second application 610 may be initiated by a user using a pop-up menu 604 or child window that lists locations where the interface tab 602 might be sent. Examples of second devices on which a second application 610 may reside may include a user's desktop computer, a laptop, an e-reader, a tablet or another device. The second application 610 may be the same type of application as the first application 601, where a web browser interface tab 602 may be sent to a second web browser. Additionally, the second application 610 may be a different type of application that is able to contain or host the interface tab 602 sent from the first application 601. As additional examples, an interface tab from a web browser may be sent to a word processor application or an interface tab from a database viewer may be sent to a spreadsheet application and vice-versa.

When the interface tab 602 is being sent to the second application 610, the amount of computing resources to be applied to the newly created interface tab 612 may be defined. More specifically, the first computing device may determine an amount of computing resources that may be applied to loading the page content in the second application 610 based on the resources available on the second computing device. Alternatively, the second computing device or the second application 610 may determine the amount of computing resources that are defined to be applied to the new interface tab 612. The page content may then be loaded into the newly created interface tab 612 using the computing resources defined.

In a further example, the first computing device may determine the amount of computing resources to be applied to load the page content for the interface tab 612 on the second computing device or second application 610 and the time at which the computing resources may be applied. In addition, the computing resources may be applied based on a time schedule. For example, a user may schedule computing resources to be applied to loading the page content of one or more interface tabs at 6 PM before the user arrives home. The user may immediately view the interface tabs upon arrival at home without delay because the interface tabs were loaded in the second application 610 before the user arrived home.

Figure 6B:
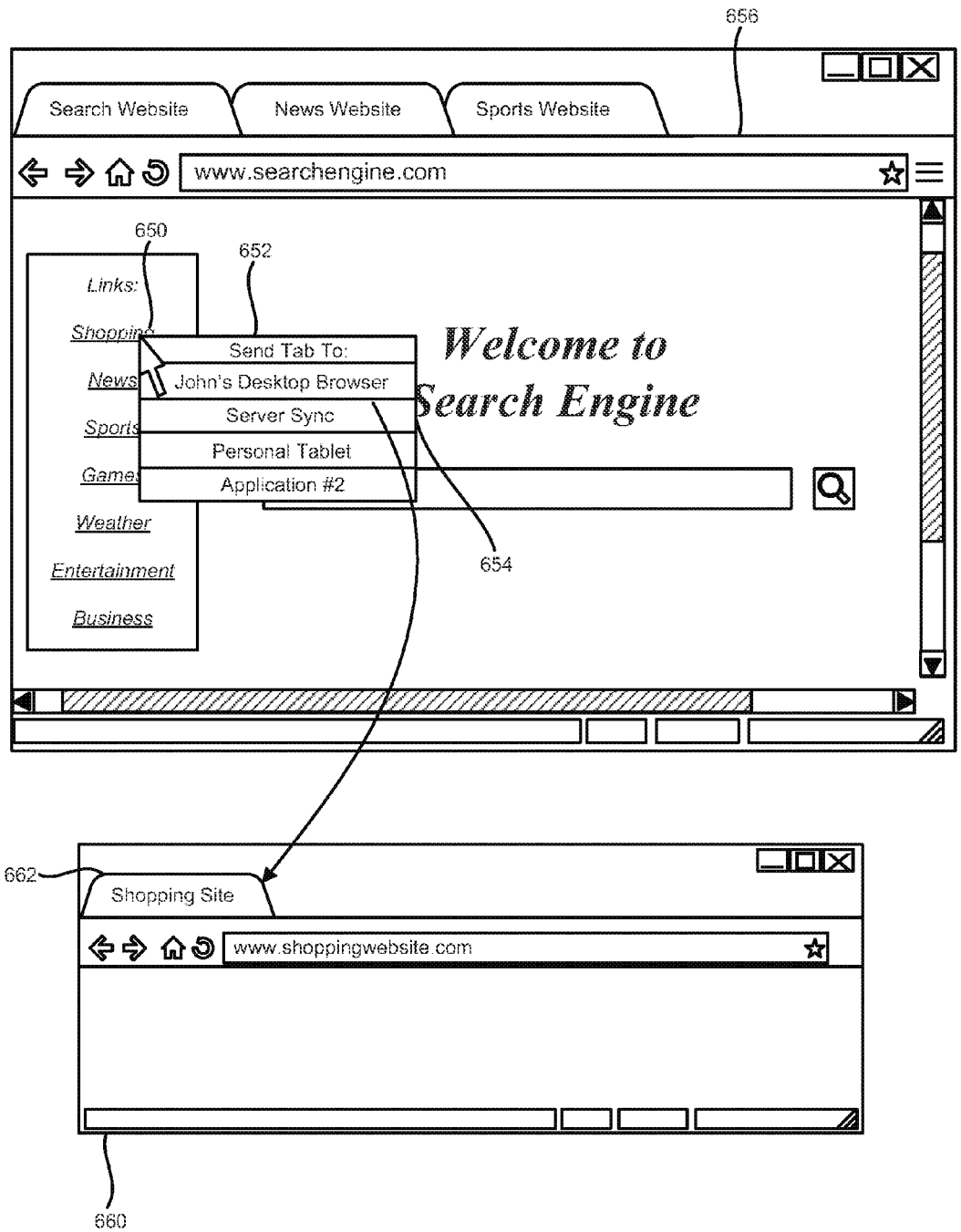
FIG. 6b is a diagram illustrating an example of an interface where a link may be sent to a second application with an interface tab.

FIG. 6b illustrates an interface where a link 650 may be sent to a second application 660 and the link may be associated with an interface tab 662 in the second application 660. The second application 660 may be located on a separate computing device that may be accessible over a network. The user may open a pop-up menu 652 or another menu type in proximity to the link to select where the link may be sent. In addition, the opening of the pop-up menu 652 may be associated with an action key from the keyboard such as a command key, control key, function key, alt key or another function key. After an area near the link may have been selected with the function command, then a selection interface may be presented to select where 654 to send the interface tab 662.

In an alternative configuration, the interface tab 662 may be sent directly to a second application 660 that has been configured in the first application 656 to receive the interface tab 662. Directly sending the interface tab 662 to the second application 660 may bypass the operation of opening up a menu, pop-up window or a similar interface to select the destination of the interface tab 662. In this case, one destination may be set in advance through the web browser's configurations or settings. When an interface tab 662 is sent directly to the second application 660, the interface tab 662 may be set to load the page content with restricted resources.

The interface tab and associated page content illustrated in FIGS. 6a-6b may also be sent to a centralized server using a "server sync" menu item 654 instead of sending the interface tab and associated page content to a second application 660. The interface tab may be sent to the centralized server to enable the interface tab to be downloaded to other devices. This allows a user to store interface tabs and related URLs on a central server and to later move the interface tabs onto another client device. For example, a user may pre-load a number of interface tabs from a first website in a first web browser's browsing session with articles, slideshows, videos or other web pages to be viewed. But then the user may need to leave the browsing session and the user may not have time to view the pre-loaded interface tabs in the first web browser. In this situation, the user may select to transfer the interface tabs to a centralized server for storage. The interface tabs may have a restricted resource usage or no resource usage applied before the interface tabs are sent to the centralized server for storage. The storage of the interface tabs allows the user to view the interface tabs when the user returns even if the user has turned off the computing device. Further, the user may download the interface tabs from the centralized server (a.k.a., the cloud) to a second client device that is different from where the interface tabs may have been created. The downloaded interface tab may have the computing resources limited until the downloaded interface tab is selected by the user. In one example configuration, page content for URLs associated with the interface tab may not be stored on the centralized server. So, the websites, articles and video may then be accessed from the second client device onto which the interface tabs may have been downloaded. Alternatively, the page content may be downloaded on to the centralized server which may potentially optimize the page content for viewing in the interface tabs.

Figure 7:
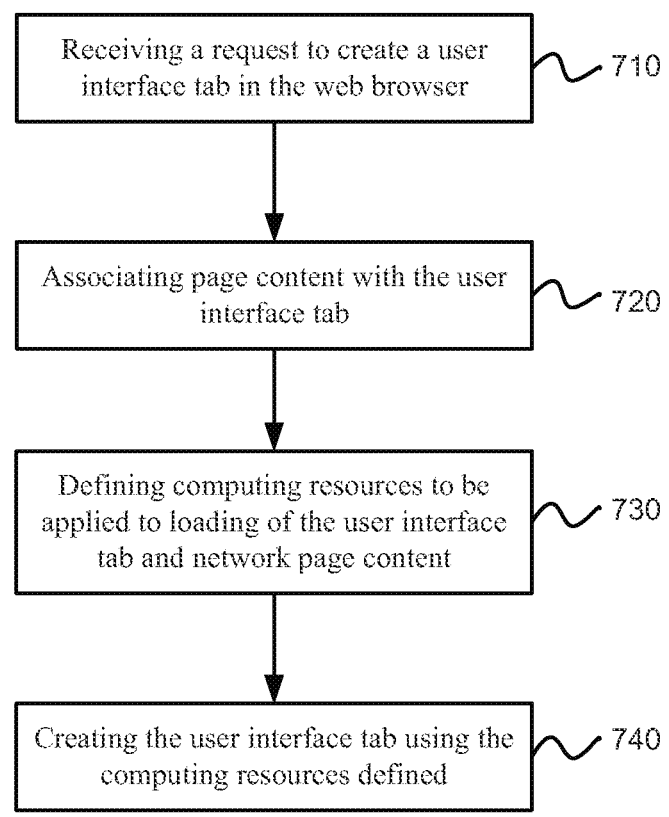
FIG. 7 is a flowchart illustrating an example method for preparing an interface tab in a web browser.

FIG. 7 is a flowchart illustrating an example of a method for preparing an interface tab in a web browser. A request to create an interface tab in the web browser may be received, as in block 710. The request may be received through a graphical user interface (GUI) associated with the web browser. The request may be initiated by the selection of a link or a data source using a pointing device and/or by another action or operation that identifies that a new interface tab is to be created. For example, a key or menu item may be selected in combination with clicking on or near the link (e.g., electronic object) for which the new interface tab may be created. A link or another object type that references a data source may be used as the basis for creating the interface tab. Page content may be associated with the interface tab, as in block 720.

Interface tab creation may also be initiated by a program or process. A browser may load page content which may open another interface tab using a program. Other applications on a computing device may open a browser window too. For example, a program may open an interface tab when installing or uninstalling software, clicking a help button in the software, presenting supplemental information, and so forth. This means that a browser application or a non-browser application may open an interface tab without user input directing the opening of the interface tab.

Computing resources may be defined to be applied to loading of the interface tab and page content, as in block 730. In one configuration, an instance of the interface tab may be created in a memory device. However, a limited amount of a computing resource or none of a computing resource may be applied toward loading the page content until the interface tab is selected. These computing resource limitations may also be applied to multiple computing resource types as discussed earlier.

The content objects in page content can be divided into multiple object types, as discussed earlier. An example of object types may be size, video objects, text objects, audio objects, graphic objects, animations, etc. The objects may be sorted based on a size or a preferred type for loading into the interface tab. Certain object types may be selected to load at certain rates depending on a sort order of the categories, or some object types may not load until the interface tab is selected.

Once the interface tab has been selected by a user, the interface tab may then be created using the computing resources defined, as in block 740. For example, a predefined network bandwidth limit and/or predefined processor allocation may be applied to loading of page content for the interface tab. A processor allocation may be measured in processor time slices or on a percentage of a processor's computing time that is allocated to the interface tab. A network bandwidth may be measured, for example, in bits per second and a percentage of the overall available bits per second may be allocated to the downloading of the page content.

Whether or not the page content for the interface tab is immediately loaded may, in some cases, be determined by the computing resources that are available. For example, the available processing power of the processor(s) may be determined. In other words, the system may check to determine whether a threshold amount of processing power is available for loading the page content into the interface tab. When the threshold amount of processing power is available then the page content may be loaded into the interface tab. In other words, when the amount of available processing power exceeds the predefined threshold amount, then loading of the interface tab may occur. A similar threshold application process may apply to other resources such as memory device resources and network bandwidth resources.

This technology may avoid the situation that may occur on existing computing devices where a user loads multiple interface tabs in an application and each of these interface tabs may consume processing resources, network bandwidth resources and memory resources. These computing resources may be consumed even if the user does not use the interface tabs immediately or does not end up viewing the interface tabs ever. In fact, a user may close the application before ever viewing any of the interface tabs but the computing resources will have been consumed earlier. Thus, this technology may avoid the consumption of computing resources until the interface tab is selected for use.

Figure 8:
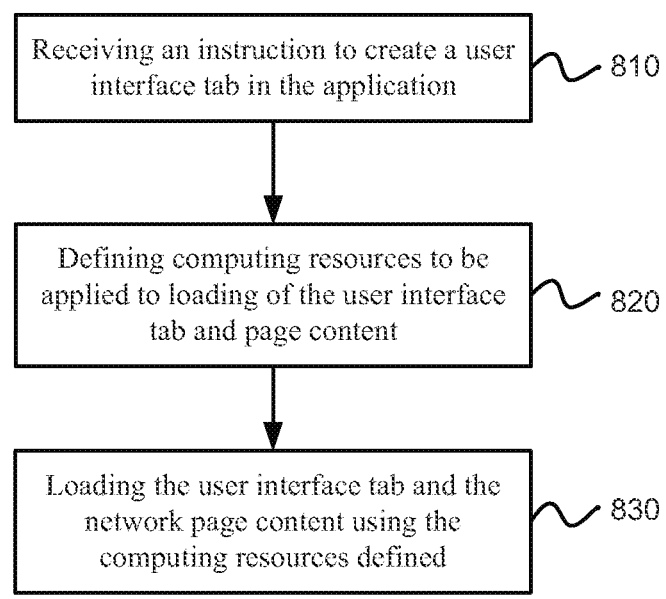
FIG. 8 is a flowchart illustrating an example method for generating an interface tab in an application.

FIG. 8 illustrates a method for generating an interface tab in an application. The method may include receiving an instruction to create an interface tab in the application, as in block 810. The instruction to create the interface tab may be received in response to a request from a user who may select a URL (universal resource locator) with instructions for creating a new interface tab based on the URL.

Computing resources may be defined that are to be applied to loading of the interface tab and page content, as in block 820. The computing resources applied to an interface tab may include limited processing resources, memory resources and limited network bandwidth. As described earlier, a specific percentage or defined amount of a total available computing resource may be applied to the page content of the interface tab. Then the page content may load in the background at the defined rate for the individual computing resources. If the interface tab is clicked on by a user, then the page content may load at a faster rate than the defined amount. Increasing the page content loading rate for one interface tab may also involve some readjustment of computing resources applied to other interface tabs loading page content at restricted rates.

In one configuration, an interface tab may be created but the interface tab contents may not be loaded immediately. More specifically, no computing resources may be applied to loading page content until the interface tab is selected. A limited amount of memory device storage space may also be allocated to store page content until the interface tab is selected. The computing resources limitation may conserve the computing resources until the user is ready to view the interface tab, and the conserved computing resources may otherwise be used by background loading of the interface tab.

The interface tab and the page content may be loaded using the computing resources defined, as in block 830. The interface tab and the page content may be loaded from a data source and the interface tab and the page content may be displayed to the user who selected the interface tab.

Instead of waiting for the user to select the interface tab, loading of the page content into the interface tab may be started when a threshold amount of computing resources are available. When the threshold amount of computing resources are available for loading of the page content into the interface tab, then a limited amount of computing resources may be applied to the loading of the page content or the entire computing resource pool may be applied. For example, a threshold amount of computing resources may be 30% of computing resources that are available for a specific computing resource type. For example, when processing resources being consumed fall below 70%, which means that at least 30% of the processing resources are available, then a specific amount of processing resources may be applied to loading the page content. In a specific example, the specific amount of allocated processing resources may be 10% of the processing resources that are applied to loading the page content. This allocated amount may be reduced, for example, if a large number of interface tabs are loading at a same time.

In another configuration, the computing resources assigned to the interface tab may be a limited network bandwidth or a limited processing load used to load page content. This may allow the interface tab to slowly load in the background over time. If enough time passes before the user selects the interface tab, then the page content for the interface tab may completely load in the background. Then when the user selects the interface tab, no loading of page content may be performed. Where less time passes before the user selects the interface tab, then portions of the page content may have loaded with other portions remaining yet-to-be loaded. If the user interface page has been selected where some portions of the page content have not been loaded, then the entire set of computing resources requested by the interface tab may be applied to load the remaining page content.

Applying limited computing resources to loading the interface tab may strike a balance between consuming computing resources and reducing loading time for the user when the user selects the interface tab. Furthermore, the use of limited computing resources to load the interface tab may load the interface tab slowly when the interface tab has not been selected without making the computing device unresponsive or sluggish. Applying a limited amount of resources is also useful because the user may view the portion of the page content that has already loaded immediately upon selecting the interface tab and the remaining portion of the page content may be loaded when the user selects the interface tab.

A priority rank may be applied to interface tabs in the application. The interface tabs may be prioritized in the order that they are created, so the oldest interface tabs may have the highest priority. Alternatively, the interface tabs may be ranked in the reverse order where the most recently created interface tab may have the highest priority. In another configuration, a user may provide a priority ranking for the interface tabs by providing a numerical input or by graphically arranging the interface tabs in a graphical list.

Providing a priority ranking to an interface tab may allow computing resources to be applied to the interface tabs at a rate defined by an interface tab's priority in the tab queue. For example, the interface tab with the highest priority may receive a base amount of computing resources and each subsequent interface tab may receive 50% less of the computing resources than the interface tab with an immediately higher priority. So, for example, the first unselected interface tab may receive 20% of the computing resources, the second unselected interface tab may receive 10% of the computing resources, the second unselected interface tab may receive 5% of the computing resources and so forth.

In another arrangement, a priority weighted amount of computing resources may be allocated to each interface tab based on the interface tabs' priority weighting and a total number of interface tabs. For example, a total of 40% of the computing resources may be applied to unselected interface tabs. Accordingly, the total computing resources may be split between the unselected or hidden interface tabs based on the interface tabs' priorities. An implementation example may take the total number of interface tabs and split the computing resources across the interface tabs and then weigh by priority. For example, the first priority interface tab may get a 1.50 weighting, the second interface tab may get a 1.0 weighting, the third interface tab may be a 0.5 weighting, the fourth interface tab may get a 0.25 weighting and so on until the allocated computing resources are consumed by the interface tabs. Where a large number of unselected interface tabs exist, then some of the interface tabs may receive little to no computing resources until the other interface tabs have been loaded, de-selected or closed.

Page content may also be blocked from loading for unselected interface tabs on a mobile device until a network connection of specific cost or bandwidth is available. The user may also select in a user interface whether the user is more concerned with cost or bandwidth. So, the user may specify which connections the user has access to and which of these connections are cost effective, more expensive, high bandwidth, low bandwidth or have bandwidth caps. For example, if a non-cellular connection is available as compared to a cellular wireless network connection for a mobile device then a page may load because the non-cellular bandwidth connection does not have a bandwidth cap. In addition, page content may load when the network connection that has a reduced cost, increased bandwidth, or higher data limit cap than a previous network connection. In another example, the page content for the interface tab may be loaded when a non-cellular wireless or wired network connection is available. For example, when a Wi-Fi connection or local Bluetooth connection is available, the user interface connection may begin to download page content for an interface tab in the background. Where a wired connection is available, then downloading of page content may also occur. This allow may allow a user to conserve bandwidth on a limited cell phone data plan or avoid incurring charges for going over a data limit with cell phone network downloads. Further, the user may save selected interface tabs for downloading until a faster speed connection is available. This may be useful where the interface tabs contain comparatively high bandwidth content such as video, animations, large data files or other high bandwidth content.

Figure 9:
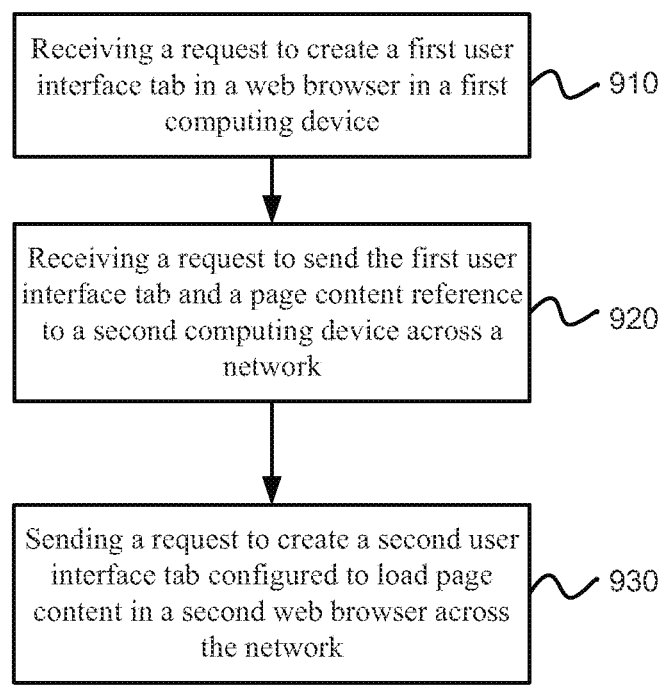
FIG. 9 is a flowchart illustrating an example method for transferring an interface tab to a second application.

FIG. 9 illustrates a method for transferring an interface tab to a second application. The method may include receiving a request to create a first interface tab in a web browser of a first computing device, as in block 910. The request may be received using a graphical user interface object in proximity to the first interface tab. The graphical user interface object may be a pop-up menu, a tooltip, a menu item or a graphical button.

Another operation is receiving a request to send the first interface tab and a page content reference to a second computing device across a network, as in block 920. A request to create a second interface tab configured to load page content may be sent, as in block 930. The page content may be identified by a network page reference or URL. The second interface tab may be loaded in the second web browser of a second computing device located across the network from a first computing device. In one example, the page content of the interface tab may be loaded immediately in the second application on the second computing device. In an alternative configuration, when the second interface tab is selected by the user on a second computing device, then the page content may be loaded after the second interface tab is selected.

The computing resources on the second computing device may be checked using a request from the first computing device (e.g., using a resource measurement module). This computing resource data may be used to determine a predefined amount of computing resources that are available to load the interface tab. Once the predefined amount of computing resources are associated with the interface tab, then the second application may be instructed to apply a predefined amount of computing resources on the second computing device to load the interface tab and associated page content. Alternatively, instead of the first computing device performing the check for the computing resources, the second device or second application may check the second device's own computing resources and apply a portion of the computing resources to loading the page content for an interface tab.

Figure 10:
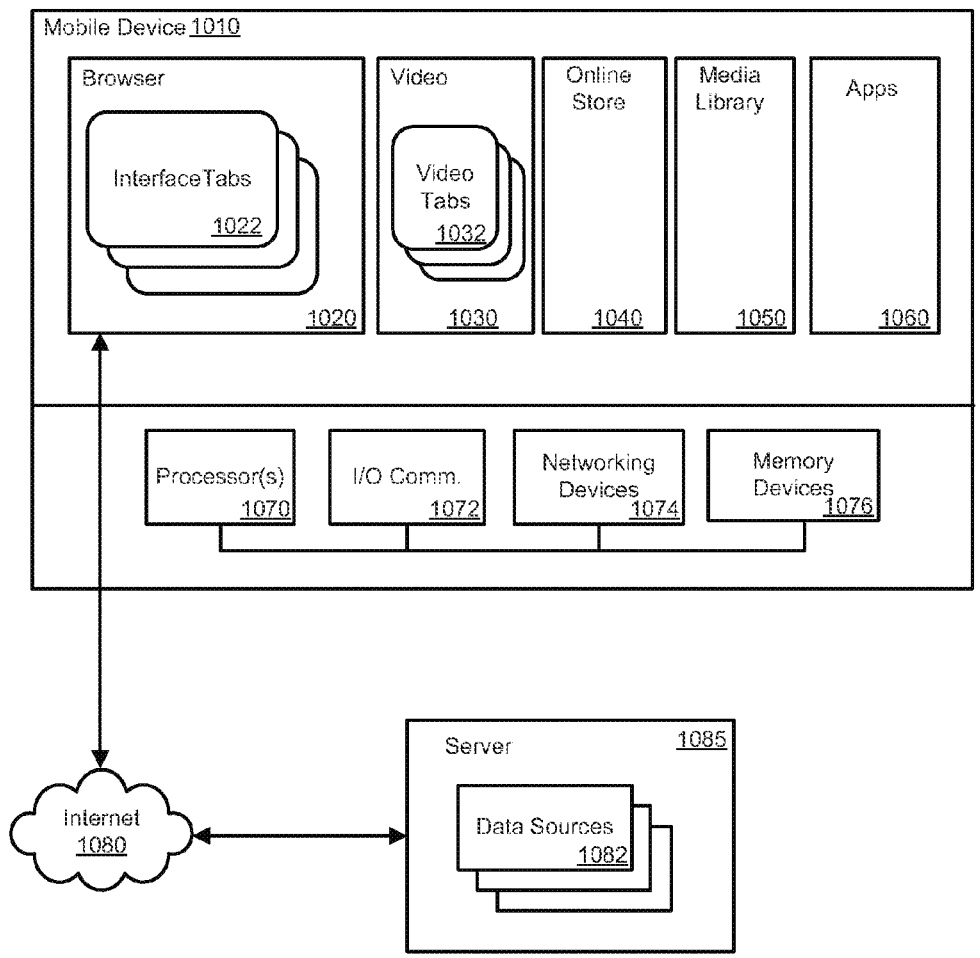
FIG. 10 is a block diagram illustrating an example of a mobile device using interface tabs.

FIG. 10 illustrates an example of mobile device 1010 or a client device on which interface tabs 1022 may be created for a browser 1020. In one example, the mobile device may be a tablet device, a cell phone, a laptop computer, an electronic book reader, set-top box, game console or another mobile computing device. This mobile device 1010 may have an operating system that is configured to receive user interface requests that may open an interface tab without loading the page content for the interface tab. When the loading of the page content is delayed or blocked, then the load on the network connection to the Internet 1080 is reduced along with the load on a data server or web server 1085 that supplies the information from the data sources 1082 located on the data server.

A video client 1030 may be located on the mobile device 1010. The video client 1030 may receive streaming video, play downloaded video files or playback video content stored on the client. The video content that is presented to the viewer may be queued up using video interface tabs 1032. When a user sees multiple videos in a list that the user desires to view, an interface tab may be created for each of the user selected videos. Then as the user completes the viewing of one video, another interface tab may be selected and the video in the interface tab may begin to load. In other words, the user may create video interface tabs as placeholders for programs they want to watch without the video beginning to load until the interface tab is selected.

Accessing other content in a media library 1050 such as a book, movie, song or other media may be performed through an interface tab. This allows interface tabs to be created without the interface tab loading and then when the interface tab is selected, the book, music or magazine may begin to load. Access to an online store 1040 may also be provided on the mobile device.

A user may also access an application 1060 (i.e., an app) or applet which may be connected to a data source 1082. The end user may want the apps to be on their desktop but the user does not want the apps to access data sources 1082 unless the user calls for that action. For example, a user may have apps that constantly pull data from data sources without user permission. The user may then put each of these apps on an interface tab so that the application 1060 is not allowed to retrieve data until the user selects the interface tab on which the app resides. Alternatively, the apps, videos, media and other items on the tab interfaces may load at a reduced rate in the background before the interface tabs are selected.

FIG. 10 illustrates that the mobile device 1010 may be a computing device or computing node that includes hardware processor devices 1070, hardware memory devices 1076 and Input/Output (I/O) device communication 1072 to enable communication between hardware devices and I/O components. Networking devices 1074 may also be provided for communication across a network with other nodes of the technology. The network device 1074 may provide wired or wireless networking access for the mobile device 1010. Examples of wireless access may include cell phone network access, Wi-Fi access or similar data network access.

Figure 11:
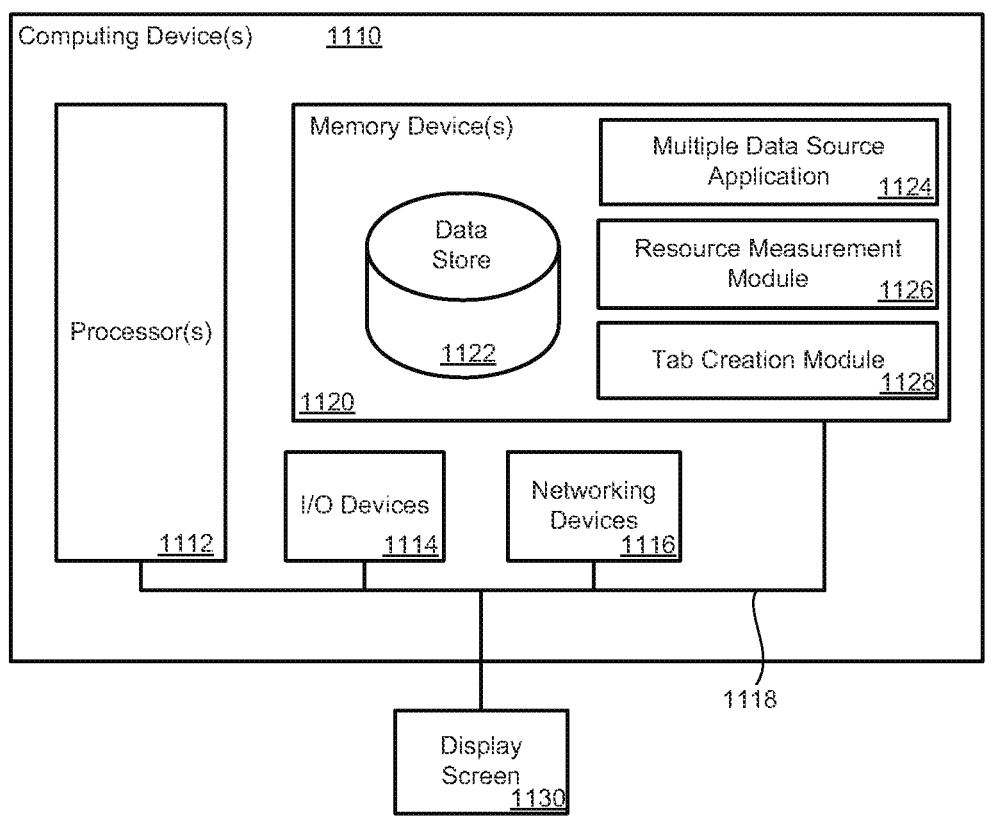
FIG. 11 is block diagram illustrating an example of a computing device for using interface tabs.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device 1120 may contain modules that are executable by the processor(s) 1112 and data for the modules. Located in the memory device 1120 are modules executable by the processor. For example, a multiple data source application 1124, a resource measurement module 1126 and the tab creation module 1128 and other modules may be located in the memory device 1120. The modules may execute the functions described earlier. A data store 1122 may also be located in the memory device 1120 for storing data related to the modules and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen 1130 that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112 or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may be varied from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein, which would occur to one skilled in the relevant art and having possession of this disclosure, are to be considered within the scope of the description.

Furthermore, the described features, structures or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for preparing an interface tab in a web browser, comprising:
   receiving a request to create the interface tab in the web browser, using a processor;
   associating page content with the interface tab;
   defining a limit on computing resource usage to be applied to loading of the interface tab and page content, using the processor, which limit is less than available computing resources, the limit being defined as a percentage of the available computing resources;
   creating the interface tab using the limit on the computing resource usage defined; and
   redefining the limit on computing resource usage upon selection of the interface tab via a graphical user interface;
   categorizing content objects in the page content of the interface tab into smaller content objects and larger content objects;
   determining the limit on computing resource usage for loading the page content into the interface tab; and
   visually loading the smaller content objects in the graphical user interface followed by the larger content objects when the available computing resources are limited according to the percentage of the available computing resources defined.

2. The method as in claim 1, wherein defining the limit on the computing resource usage further comprises creating an initial instance of the interface tab in a memory device and applying no computing resources toward loading the page content until the interface tab is selected.

3. The method as in claim 1, wherein defining the limit on the computing resource usage further comprises applying a predefined network bandwidth limit and predefined processor allocation to loading of page content.

4. The method as in claim 3, wherein the processor allocation is processor time slices.

5. The method as in claim 1, further comprising:
determining available processing power for the processor;
checking whether a threshold amount of processing power is available to load the page content into the interface tab;
loading the page content into the interface tab when the threshold amount of processing power is available; and
creating the interface tab without loading the page content when the threshold amount of processing power is unavailable.

6. A method for generating an interface tab in an application, comprising:
receiving an instruction to create the interface tab in the application;
defining limited computing resource usage that is to be applied to loading of the interface tab and page content, using a processor, the limited computing resource usage being defined as a percentage of available computing resources;
loading the interface tab and the page content using the limited computing resource usage defined, using the processor, wherein loading the interface tab and the page content comprises:
categorizing content objects in the page content of the interface tab into smaller objects and larger objects;
determining that the percentage of limited computing resources are available for loading the page content into the interface tab; and
visually loading the smaller content objects in a graphical user interface followed by the larger content objects when the available computing resources are limited and according to the percentage of available computing resources defined;
receiving a selection of the interface tab; and
loading the page content at a computing resource usage rate greater than the limited computing resource usage defined subsequent to receiving the selection of the interface tab via the graphical user interface.

7. The method as in claim 6, wherein loading the interface tab and the page content using the limited computing resource usage further comprises, applying no computing resources to an initial loading of the page content until the interface tab is selected.

8. The method as in claim 6, wherein the limited computing resource usage includes a limited network bandwidth or a limited processing load used to load the page content.

9. The method as in claim 6, wherein the limited computing resource usage includes limited memory device storage to store the page content until the interface tab is selected.

10. The method as in claim 6, further comprising loading the page content into the interface tab when a threshold amount of processing power is available to load the page content into the interface tab using the limited computing resource usage.

11. The method as in claim 6, further comprising:
hiding a subsequent interface tab until an active interface tab has been unselected or closed, wherein hiding the subsequent interface tab is a result of the limited computing resource usage defined;
displaying the subsequent interface tab when the active interface tab is unselected or closed; and
loading page content of the subsequent interface tab at a computing resource usage rate greater than the limited computing resource usage defined after the active interface tab is unselected or closed.

12. The method as in claim 6, further comprising a tab queue having a plurality of hidden interface tabs which are hidden as a result of the limited computing resource usage defined.

13. The method as in claim 12, further comprising applying differing rates of computing resources to the hidden interface tabs based on an interface tab's priority rank in the tab queue.

14. The method as in claim 6, wherein the interface tab comprises a plurality of interface tabs, the method further comprising applying a priority rank to the plurality of interface tabs based on a graphical arrangement of the interface tabs, wherein the limited computing resource usage is defined separately for each of the plurality of interface tabs based on respective priority ranks for the plurality of interface tabs.

15. The method as in claim 6, wherein receiving the instruction to create the interface tab further comprises receiving a request from a user to create the interface tab based on the user selecting a URL (universal resource locator).

16. The method as in claim 6, further comprising waiting to load the page content for the interface tab until a network connection of specific cost or network bandwidth is available.

17. The method as in claim 6, further comprising sending the interface tab to a second application to be loaded and waiting to load page content associated with the interface tab at the second application until a scheduled time input by a user via the graphical user interface.

18. The method as in claim 6, further comprising:
sending the interface tab to a second application; and
loading the interface tab in the second application using the limited computing resource usage defined.

19. The method as in claim 6, further comprising allocating a priority weighting of computing resources to interface tabs based on a priority weighting of interface tabs.

20. The method as in claim 6, further comprising:
categorizing the content objects in the page content of the interface tab into object types;
loading object types from categories that use reduced network bandwidth for the interface tab, wherein the object types that use reduced network bandwidth include at least one of text or small images; and
applying no network bandwidth to object types that use an increased amount of network bandwidth until the interface tab has been selected, wherein the object types that use an increased amount of network bandwidth include audio content and video content.

21. The method as in claim 6, further comprising:
hiding a subsequent interface tab until computing resource usage falls below a defined threshold;
displaying the subsequent interface tab when the computing resource usage falls below the defined threshold; and
loading page content of the subsequent interface tab after the subsequent interface tab is displayed.

22. A system for creating interface tabs, comprising:
a multiple data source application executing using a processor and memory device;
a plurality of data sources connected to the multiple data source application, the interface tabs being associated with the plurality of data sources;
a resource measurement module to measure computing resources available for interface tab creation; and
a tab creation module, associated with the multiple data source application, to create an interface tab and load page content from at least one of the plurality of data sources into the interface tab using a predefined limit on computing resources, the predefined limit being a percentage of available computing resources less than the available computing resources and which is variable based on a presence of other created interface tabs;

wherein the tab creation module creates the interface tab and loads the page content based on the predefined limit on computing resources, based on the presence of the other created interface tabs, and further based on user interaction with the interface tab via a graphical user interface, the tab creation module being further configured to: categorize content objects in the page content of the interface tab into smaller objects and larger objects and load the smaller content objects in the graphical user interface followed by the larger content objects according to the percentage of available computing resources defined.

23. The system as in claim 22, wherein no computing resources are applied to loading page content from creating the interface tab until the interface tab is selected.

24. The system as in claim 22, wherein the resource measurement module measures defined computing resources including memory device resources, processing resources, display screen resources or network bandwidth resources.

25. The system as in claim 22, wherein the predefined computing resources includes loading page content into background interface tabs using limited network bandwidth and processor power.

26. The system as in claim 22, further comprising checking whether a threshold amount of processing resources are available for loading the page content into the interface tab before loading of page content begins.

27. The system as in claim 22, further comprising checking whether a threshold amount of network bandwidth is available for downloading of the page content into the interface tab.

28. A method for transferring an interface tab, comprising:
receiving a first request to create a first interface tab in a web browser, using a processor in a first computing device;
receiving a second request to send the first interface tab and a network page reference to a second computing device across a network;
sending the second request to create a second interface tab configured to load page content identified by the network page reference, the second interface tab being in a second web browser of a second computing device across the network;
creating the second interface tab, including loading the page content, in the second web browser of the second computing device using a predefined limit on computing resources defined as a percentage of available computing resources;
categorizing content objects in the page content of the second interface tab into smaller objects and larger objects;

loading the smaller content objects in a graphical user interface followed by the larger content objects according to the percentage of available computing resources defined; and loading the page content in the second interface tab using greater than the predefined limit on computing resources upon selection of the second interface tab via the graphical user interface at the second computing device.

29. The method as in claim 28, wherein receiving the second request to send the first interface tab further comprises receiving the second request via a graphical user interface object in proximity to the first interface tab to send the first interface tab to the second computing device.

30. The method as in claim 29, wherein the graphical user interface object is a pop-up menu, a tooltip, a menu item or a graphical button.

31. The method as in claim 28, further comprising:
checking computing resources on the second computing device upon request from the first computing device;

determining a predefined amount of computing resources that are available to load the interface tab; and instructing the second web browser to apply a predefined limit on computing resource usage on the second computing device to load the interface tab and associated page content.

32. A method for generating a child window interface in an application, comprising:
receiving an instruction to create the child window interface in the application;

defining limited computing resource usage that is to be applied to loading of the child window interface and page content, using a processor, the limited computing resource usage being defined as a percentage of available computing resources; and loading the child window interface and the page content using the limited computing resource usage defined, using the processor, until the child window interface is selected, wherein loading the child window interface and the page content comprises:

categorizing content objects in the page content of the child window interface into smaller objects and larger objects; and loading the smaller content objects in the child window interface followed by the larger content objects according to the percentage of available computing resources defined; and loading the page content using greater than the limited computing resource usage defined after the child window interface is selected.

* * * * *